US006934893B1

(12) United States Patent
Pascal

(10) Patent No.: US 6,934,893 B1
(45) Date of Patent: Aug. 23, 2005

(54) METHOD OF MONITORING THE ACTIVATION OF PROGRAMMED SEQUENCES OF A PROGRAMMED SYSTEM AND COMPUTER PROGRAM AND APPARATUS FOR IMPLEMENTING SAME

(75) Inventor: Janin Pascal, Tullins (FR)

(73) Assignee: STMicroelectronics S.A., Gentilly (FR)

( * ) Notice: Subject to any disclaimer, the term of this patent is extended or adjusted under 35 U.S.C. 154(b) by 584 days.

(21) Appl. No.: 09/714,326

(22) Filed: Nov. 16, 2000

(51) Int. Cl.[7] .................................................. G06F 11/00
(52) U.S. Cl. .......................................... 714/51; 717/127
(58) Field of Search .............................. 714/51, 47, 50, 714/39, 37, 38, 52; 717/124, 114, 120, 127, 128, 9, 4, 5

(56) References Cited

U.S. PATENT DOCUMENTS

| | | | | |
|---|---|---|---|---|
| 3,906,454 A | * | 9/1975 | Martin | 714/45 |
| 5,134,701 A | * | 7/1992 | Mueller et al. | 703/22 |
| 5,218,525 A | * | 6/1993 | Amasaki et al. | 700/26 |
| 5,341,497 A | * | 8/1994 | Younger | 714/51 |
| 5,442,777 A | * | 8/1995 | Nakajima et al. | 714/20 |
| 5,463,544 A | * | 10/1995 | Ohta | 700/18 |
| 6,134,710 A | * | 10/2000 | Levine et al. | 717/158 |
| 6,463,555 B2 | * | 10/2002 | Nitschke et al. | 714/55 |
| 6,587,967 B1 | * | 7/2003 | Bates et al. | 714/35 |

* cited by examiner

*Primary Examiner*—Nadeem Iqbal
(74) *Attorney, Agent, or Firm*—Lisa K. Jorgenson; Jon A. Gibbons; Fleit, Kain, Gibbons, Gutman, Bongini & Bianco P.L.

(57) ABSTRACT

The activation of programmed sequences to be executed iteratively is monitored by the sequences themselves. Each monitoring program sequence includes the additional function of monitoring at least one other sequence. The sequences can be in the form of routines, e.g. interrupt routines, and main program loops normally implemented in a programmed system. For instance, each programmed sequence performs the monitoring function by incrementing a value in a respective counter associated with each programmed sequence it monitors and by checking, for each counter, that the corresponding value has not reached a predetermined threshold. Each monitored programmed sequence resets the counter associated therewith. A failure in the activation of a particular programmed sequence is detected when a counter associated with that sequence reaches a predetermine threshold. The invention also relates to a computer program and a programmed apparatus implementing this concept.

39 Claims, 3 Drawing Sheets

METHOD OF MONITORING THE ACTIVATION OF PROGRAMMED SEQUENCES OF A PROGRAMMED SYSTEM AND COMPUTER PROGRAM AND APPARATUS FOR IMPLEMENTING SAME

BACKGROUND OF THE INVENTION

1. Field of the Invention

The present invention relates to software controlled systems, and more particularly to means for monitoring the proper execution of programmed sequences triggered by an external or internal event.

A software controlled system may be required to perform background tasks in response to certain specific triggering events, such as a signal received from an outside source, a timing signal from built-in timer, etc. These events must often be processed as soon as they arrive. This gives rise to an interruption in a main program: an event comes up causing an interrupt routine to be executed, after which the system returns to its main program. In other words, an interrupt routine is a set of instructions which is triggered in response to the arrival of an event and causes an interruption in main program.

2. Prior Art

In the prior art, a problem arises when a programmed system such as a microprocessor or microcontroller unit (MCU) operates in a noisy environment susceptible of upsetting the execution of its program. As an example, this situation can arise in a monitor display unit housing a display device, such as a cathode ray tube (CRT) , and microprocessor-controlled drive circuitry. The latter is used both to interface the display device with the video input and to provide user functions for controlling display parameters (e.g. contrast, color, brightness, image distortion correction, image positioning etc.) through pushbuttons and/or on screen menus.

In this environment, the high voltages generated for the CRT can produce electrostatic or electromagnetic noise, often in the form of spikes, that can deprogram or corrupt internal circuits or peripheral circuits of the microcontroller, such as the program registers, internal memory etc. When this happens, there is no automatic diagnostic tool which can inform of the failure. In particular, a noise-induced disruption can stop or prevent the execution of one or several interrupt routines. In the example, this could cause the monitor to become blocked in an undetermined or even dangerous state.

SUMMARY OF THE INVENTION WITH OBJECTS

In view of the foregoing, it is an object of the invention to provide means capable of ensuring that interrupt routines that are critical for the operation of a programmed system can be monitored systematically and reliably.

The invention achieves this object by an approach based on using the different interrupt routines of a programmed system to monitor each other. In this way, a failure in the execution of a monitored interrupt routine would be detected by another interrupt routine (this one having been correctly triggered). The detection can then be used to reset or reboot the program and thus resume normal functioning on a sound basis.

According to a first aspect, the invention provides a method of monitoring the activation of programmed sequences of a programmed system comprising at least a first and a second programmed sequence, each to be executed iteratively, wherein the first programmed sequence is made to monitor the execution of the second programmed sequence, and the second programmed sequence is made to monitor the first programmed sequence. The programmed sequences are advantageously taken from the group consisting of: routines, such as interrupt routines, and main program loops. For instance, it may comprise at least one interrupt routine triggered by an event generated by a timer or an external signal.

In a preferred embodiment, the first programmed sequence incorporates the steps of resetting a first counter associated therewith and incrementing a second counter associated with the second programmed sequence, and the second programmed sequence incorporates the steps of resetting the second counter and incrementing the first counter, a failure in the activation of a particular programmed sequence being detected when a counter associated with that sequence reaches a predetermined threshold.

The predetermined threshold for a given counter can be established so as to be reached upon just one failure of the associated programmed sequence to reset that counter.

A detected failure in the activation of a programmed sequence can be made to cause a complete or partial reset of the programmed system.

According to a second aspect, the invention provides a method of monitoring the activation of N programmed sequences in a programmed system, each to be executed iteratively, N being an integer greater than 1, wherein each of the N programmed sequences is monitored by at least one other programmed sequence.

Each of the N programmed sequences may in this way be monitored by each of the N−1 other programmed sequences.

This can be achieved by having each programmed sequence perform the monitoring function by incrementing a value in a respective counter associated with each programmed sequence it monitors and by checking, for each counter, that the corresponding value has not reached a predetermined threshold, each monitored programmed sequence resetting the counter associated therewith, so that a failure in the activation of a particular programmed sequence is detected when a counter associated with that sequence reaches a predetermined threshold.

According to a third aspect, the invention provides a computer program comprising at least a first and a second programmed sequence, each to be executed iteratively, wherein the first programmed sequence incorporates instructions for monitoring the execution of the second programmed sequence, and the second programmed sequence incorporates instructions for monitoring the first programmed sequence.

According to a fourth aspect, the invention provides a computer program comprising N programmed sequences, each to be executed iteratively, N being an integer greater than 1, wherein each of the programmed sequences is monitored by at least one other programmed sequence.

According to fifth aspect, the invention provides a medium containing the aforementioned program.

According to a sixth aspect, the invention provides a programmed apparatus for executing iteratively at least a first and a second programmed sequence, comprising first means associated with the first programmed sequence to monitor the execution of the second programmed sequence, and second means associated with the second programmed sequence to monitor the first programmed sequence.

According to a seventh aspect, the invention provides an apparatus for executing at least N programmed sequences, each to be executed iteratively, N being an integer greater than 1, wherein each of the N programmed sequences is monitored by at least one of the N−1 other programmed sequences.

The apparatus can be made to implement the optional features mentioned above in the context of the method.

BRIEF DESCRIPTION OF THE DRAWINGS

The invention and its advantages shall be more clearly understood from reading the following detailed description of the preferred embodiments, given purely as non-limiting examples, with reference to the appended drawings in which.

DETAILED DESCRIPTION OF THE PREFERRED EMBODIMENTS

Figure 1:
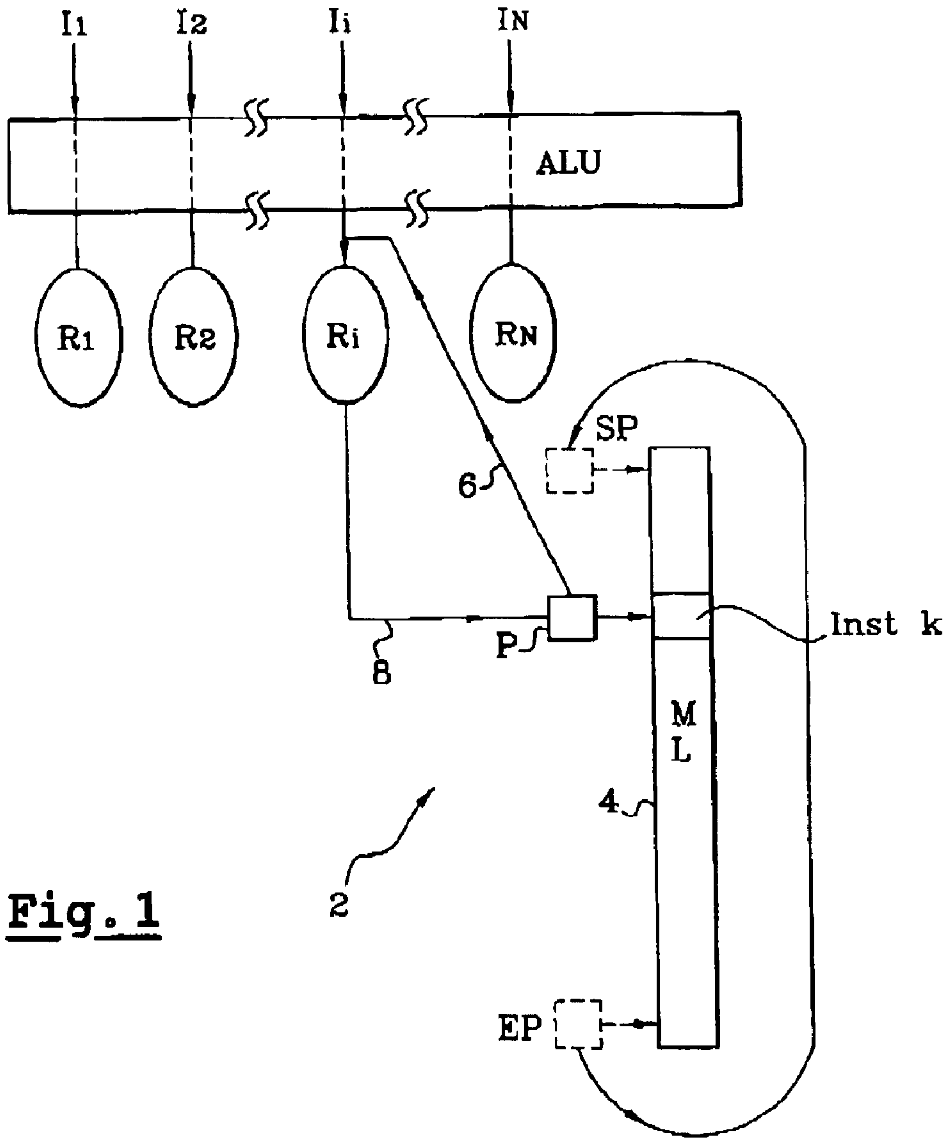
FIG.1 is a symbolic representation of a programmed system for executing a main program loop and triggered routines, in which the invention can be implemented.

An example of a programmed system in which the invention can be implemented is illustrated symbolically in FIG. 1. The programmed system 2 is e.g. a microprocessor or microcontroller unit (MCU) set to execute a program stored in a main memory area (not shown) by means of an arithmetic logic unit ALU. Here, the program is composed of a main program loop ML and N interrupt routines R1–RN. The main program loop ML forms the core of the stored program insofar as it is executed systematically and cyclically. The interrupt routines R1–RN are parts of the program that are executed upon being called. In the example, these routines R1–RN are called by respective events I1–IN, referred to as interrupt events. The interrupt events can be external, such as control or detection signals supplied to the programmed system, or internal, e.g. from built-in timers.

In the absence of interrupt events, the ALU executes the main program loop from a starting point SP to an end point EP, looping back from the latter to the starting point. The stepping through the main program loop is performed by a pointer P which reads sequentially through instructions stored in a main program register 4.

Upon occurrence of an interrupt event, the ALU immediately interrupts the main program loop ML to execute instead the corresponding routine. It thereafter returns to the main program loop ML from the point it left off at the interruption to resume execution of the main program loop.

In the illustrated example, the pointer P is at instruction k of the main program loop ML when an interrupt event Ii appears. In response, the programmed system brings the pointer P immediately to the start point of a portion where the corresponding routine Ri is stored (arrow 6) so as to step through the program instructions of the latter. Once the end point of routine Ri is reached, the pointer P is returned to instruction k of register 4 (arrow 8) to resume execution of the main program loop (assuming that instruction k was not executed at the time of interruption). The interrupt and routine execution procedures are the same for any of the other routines R1–RN.

There shall now be explained how the invention can be implemented in such a programmed system. However, to simplify the description, only two interrupt routines (designated R1 and R2) shall be considered. It shall be assumed that each of these two routines is called up at regular intervals by interrupt events I1 and I2, produced e.g. by timer signals.

Figure 2:
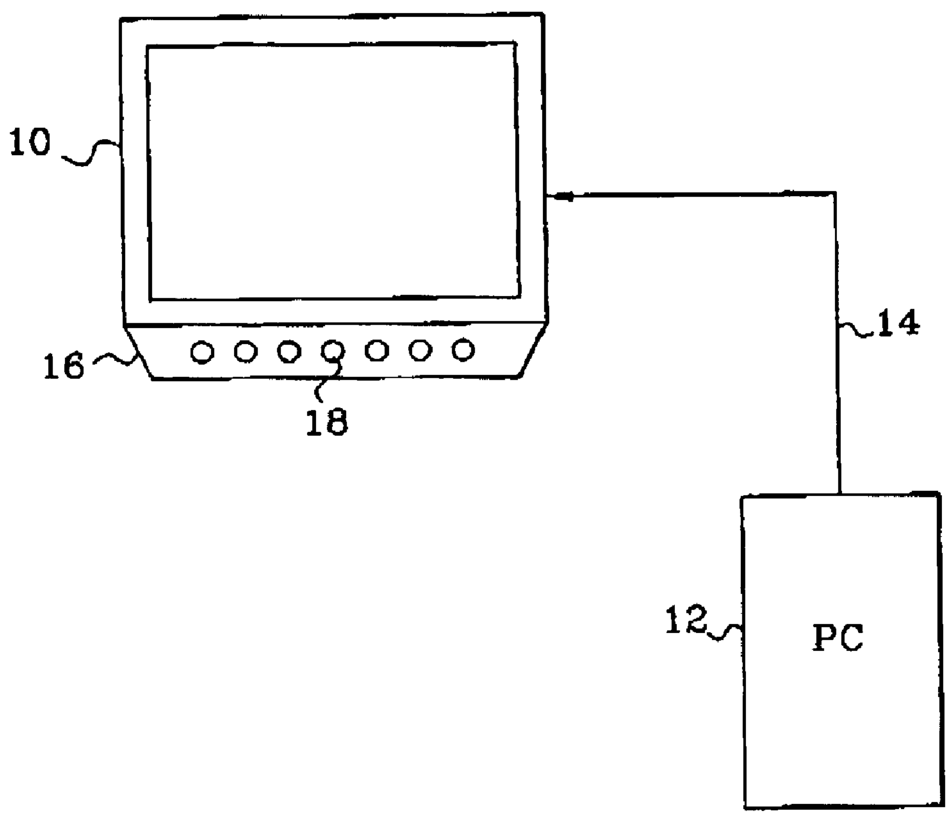
FIG.2 is a diagram showing a CRT monitor unit in which the exemplary embodiment is implemented, connected to a personal computer (PC)

In the example, the programmed system 2 happens to be installed in a CRT monitor unit 10 connected to a PC 12 via a cable link 14, as shown in FIG.2. The CRT monitor unit includes a CRT together with its high-voltage drivers which constitute a source of electromagnetic or electrostatic discharge (ESD) noise spikes. This noise can cause some of the interrupt routines to fail, e.g. by not responding to their interrupt events. The embodiment serves to ensure that such a failure can be detected and appropriate measures can be taken in response, e.g. by resetting the microcontroller.

The programmed system is based on a microcontroller unit (MCU) configured to manage the housekeeping and user functions of the monitor unit.

In particular, interrupt routine R1 is programmed to cooperate with circuitry for periodically sensing the presence of line and/or frame synchronization signals sent by the PC on the cable link 14, in order to set the monitor in a standby or energy saving mode automatically in the absence of these signals.

Interrupt routine R2 is programmed to scan periodically the state of a control panel 16 at the front of the display in order to react appropriately upon activation of a pushbutton or similar adjusting device 18. Typically, the control panel 16 allows the user to set the display brightness, contrast, geometric distortion correction, degaussing, etc.

Note that the interrupt event is not the disappearance of the synchronization signals or the activation of a pushbutton, but periodic signals to start the respective routines R1 and R2. These signals can be produced by a timer which is either internal or external to the microcontroller.

The main program loop ML takes care of the normal, steady-state operation of the monitor.

In accordance with the invention, interrupt routines R1 and R2 are provided with the additional function of mutually monitoring each other. Specifically, routine R1 is also programmed to check that routine R2 is periodically triggered for scanning the state of the control panel 16, and routine R2 is also programmed to check that routine R1 is periodically triggered for sensing the presence of the synchronization signals.

It shall be assumed that in normal, error-free, operation routine R1 is triggered every 1 millisecond (by interrupt event I1) and routine R2 is triggered every 10 milliseconds (by interrupt event I2).

Figure 3:
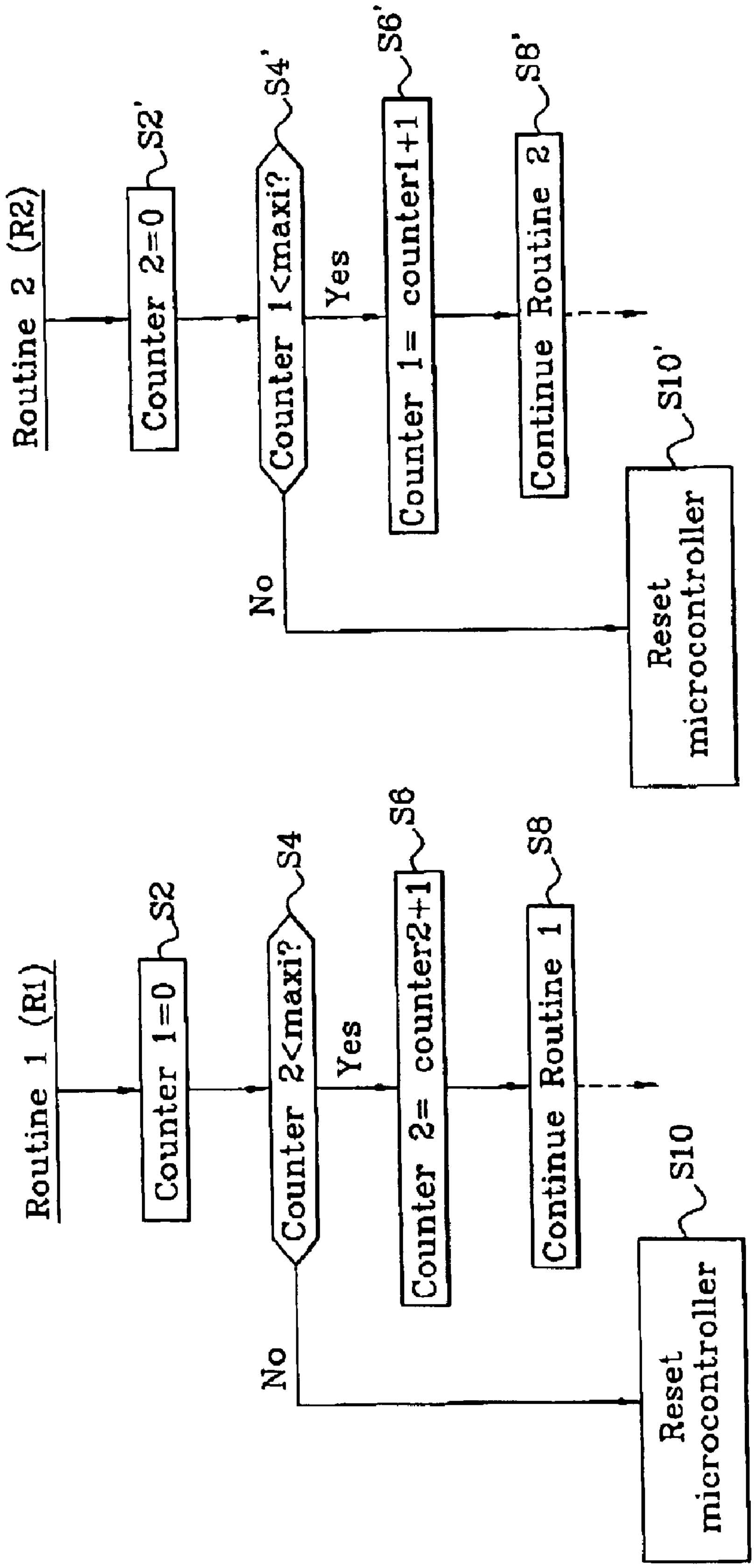
FIG.3 is a flow chart showing how two routines can monitor each other in accordance with the invention.

FIG.3 is a flow chart showing how the mutual monitoring is implemented for each of the routines R1 and R2. The concept is based on each routine causing a counter in the other routine to be incremented while resetting to zero its own counter, and determining a failure condition if the counter of the other routine reaches a maximum admissible value.

In the example, the mutual monitoring functions are implemented before the execution of the routines per se. Considering the case of routine R1, say, the procedure starts by resetting to zero an internal counter 1 associated to routine R1 (step S2). This counter is incremented by one unit each time routine R2 is activated.

Next, the value in the internal counter 2 or routine R2 is compared with a maximum admissible value MAXI (step S4). If counter 2 has not reached this value, it is deduced that this is because routine R2 was triggered when it was last expected to be triggered, so resetting counter 2 in the process before the value MAXI could be attained.

The value of counter 2 is then incremented by one unit (step S6).

Thereafter, the routine per so is executed, i.e. sensing the presence of the line and frame synchronization signals (step S8 ).

If the comparison step S4 reveals that counter 2 has reached the maximum value MAXI, it is deduced that routine R2 has not been triggered the last time it should have been, and thus could not reset in time that counter 2 to zero. Upon detecting this failure to trigger routine R2, the procedure causes the microcontroller to reset (step S1O).

The mutual monitoring procedure at the level of routine R2 mirrors that of R1, with counter 1 changed to counter 2 and vice versa; equivalent steps in the flowchart are designated with the same reference numerals, followed by a prime sign. Thus, counter 2 is reset to zero at step S2', the comparison step S4 ' is carried out with the value of counter 1, and counter 1 is incremented at step S6'.

Table I below summarizes the evolution of values in counters 1 and 2 over successive triggerings of routines R1 and R2 when no failure occurs.

TABLE I evolution of counter 1 and 2 values.
Normal operation: routine R1 interval = 1 ms,
Routine R2 interval = 10 ms.

| Routine | Counter 1 | Counter 2 |
|---|---|---|
| R1 | 0 | 1 |
| R1 | 0 | 2 |
| R1 | 0 | 3 |
| R1 | 0 | 4 |
| . . . | . . . | . . . |
| R1 | 0 | 9 |
| R2 | 1 | 0 |
| R1 | 0 | 1 |
| . . . | . . . | . . . |
| R1 | 0 | 9 |
| R2 | 1 | 0 |
| etc. | | |

It can be seen that for a comparison value MAXI set to 10 or more, none of the counters ever reaches that value under error free operation.

For MAXI =10 in the comparison step S4 of routine R1, a failure to trigger routine R2 shall be detected by routine R1 less than one millisecond later.

On the other hand, if the same value MAXI =10 is used in the comparison step S4' of routine R2, a similar failure to trigger routine Ri shall be detected by routine R2 only after 10 ×10 millisecond intervals. If this interval is too long, it is possible to use a smaller value for MAXI in routine R2, for instance 2. In general, it can be envisaged to have a specific comparison value MAXI1, MAXI2, etc. for the comparison steps S4, S4' etc. in the different routines, to suit requirements.

An example is given below of a program written in C language for executing the monitoring functions in each of the routines R1 and R2.

```
MONITORING BY ROUTINE R1
{
    COUNTER1=0;
    if (COUNTER2<MAXI)
        COUNTER2++;
    else
        RESET_MCU;
}
MONITORING BY ROUTINE R2
{
    COUNTER2=0;
    if (COUNTER1<MAXI)
        COUNTER1++;
    else
        RESET_MCU;
}
```

The above description can easily be extrapolated to any arbitrary number N of subroutines each monitoring each other.

For instance, each of the N routines of FIG.1 can be programmed to monitor the N−1 other routines. In this case, steps S4 and S6 of FIG. 3 would be repeated for each of the monitored routines, so that in the case of routine R1, say, we would have: for i =2 to N, “counter i <MAXIi ?” and “counter i =counter i+1”, with a branching to reset the microcontroller (step S10) for a negative answer at any one of steps S4.

It is also possible to arrange for each of the N routines involved in the monitoring procedure to monitor just one or a group of other routines. For instance a routine Ri can be set to monitor just routine Ri+1, with routine RN monitoring routine R1 to provide the “round robin” condition.

Moreover, the monitoring according to the invention need not be limited to routines among themselves. It can also involve one or several main program loops ML in the mutual monitoring function. For instance, in the example of FIG. 1, the main program loop ML can also include a set of program instructions to perform the steps S4 and S6 of FIG. 3 for each or some of the N routines R1–RN, as explained above. In this way, the main program loop can actively monitor each of the routines and cause a reset of the microcontroller should one or a number of these routines fail. This function can be useful for situations where a fault causes a crash of all the interrupt routines R1–RN, but not the main program loop.

Conversely, each or some of the interrupt routines R1–RN can be made to monitor the main program loop ML. The latter would then also have its own counter that would be reset at each cycle of the main program loop and be incremented by the monitoring routines.

It will be understood that where a routine or main program loop is monitored by more than other, the value MAXI for that loop should be adapted accordingly.

The action taken when a failure is detected need not necessarily be the resetting of a microcontroller. It can be any action suited to circumstances and to the characteristics of the routine or the part of the program in which the failure was detected to occur. For instance, the action can to trigger an alarm, send a warning message, switch over to a backup program, reset just a portion of the system, etc. These actions can also be different according to what is being monitored, in which case the routines R1–RN, and possibly the main loop ML, would adapt their action at step S10 depending on the routine being monitored.

The interrupt routines need not necessarily be triggered at intervals which are regular to be given a monitoring role.

The only requirement is that the routine triggering event be relatively repetitive and expected. For instance, the event may normally be expected to occur at variable intervals with a maximum interval beyond which it can reasonably be assumed that an interrupt has not been triggered. In this way, the routine(s) which monitor(s) the one expected to respond would generate an alarm or program a reset when this maximum interval is exceeded.

It is clear that the primary functions of the routines are immaterial and that the invention can be implemented in all sorts of different applications.

For instance, in the described example, other loops involved in the monitoring function can have as their primary function a timer arranged to cause an indicator light to flash, or to read the state of a specific circuit portion to report on its condition, etc.

In a broader context, the invention is useful for monitoring routines and program loops in practically every area of computer operated systems : machine control, communications, data exchange, consumer electronics, professional electronics, PC software, office and business management and accountancy computer programs, etc.

While the invention has been described in connection with a preferred embodiment, it is to be understood that the invention is not limited to the disclosed embodiment but, on the contrary, is intended to cover various modifications and equivalent arrangements included within the spirit and scope of the appended claims.

What is claimed is:

1. A method of monitoring an activation of programmed sequences of a programmed system comprising at least a first and a second programmed sequence, each to be executed iteratively, wherein said first programmed sequence is made to monitor the execution of said second programmed sequence, and said second programmed sequence is made to monitor said first programmed sequence, and wherein said first programmed sequence incorporates the steps of resetting a first counter associated therewith and incrementing a second counter associated with said second programmed sequence, and said second programmed sequence incorporates the steps of resetting said second counter and incrementing said first counter, a failure in the activation of a particular programmed sequence being detected when a counter associated with that sequence reaches a predetermined threshold.

2. The method of claim 1, wherein said programmed sequences are taken from the group consisting of: routines and main program loops.

3. The method of claim 1, wherein said programmed sequences comprise at least one interrupt routine.

4. The method claim 3, wherein said at least one interrupt routine is triggered by an event generated by a timer or an external signal.

5. The method of claim 1, wherein said predetermined threshold for a given counter is established so as to be reached upon just one failure of the associated programmed sequence to reset that counter.

6. The method of claim 1, wherein a failure in the activation of a programmed sequence, as determined by said monitoring, is made to cause a complete or partial reset of said programmed system.

7. A method of monitoring an activation of N programmed sequences in a programmed system, each to be executed iteratively, N being an integer greater than 1, wherein each of said N programmed sequences is monitored by at least one other programmed sequence, and wherein each programmed sequence performs the monitoring function by incrementing a value in a respective counter associated with each programmed sequence it monitors and by checking, for each said counter, that a corresponding value has not reached a predetermined threshold, and wherein each monitored programmed sequence resets the counter associated therewith, a failure in the activation of a particular programmed sequence being detected when a counter associated with that sequence reaches a predetermined threshold.

8. The method of claim 7, wherein each of said N programmed sequence is monitored by each of the N−1 other programmed sequences.

9. The method of claim 7, wherein, for a given counter, said predetermined threshold is established so as to be reached upon just one failure of the associated programmed sequence to reset that counter.

10. The method of claim 7, wherein said N programmed sequences are taken from the group consisting of: routines and main program loops.

11. The method of claim 7, wherein said programmed sequences comprise interrupt routines.

12. The method of claim 11, wherein said interrupt routine is triggered by an event generated by a timer or an external signal.

13. The method of claim 7, wherein a failure in the activation of a programmed sequence, as determined by said monitoring, is made to cause a complete or partial reset of said programmed system.

14. A computer program of comprising at least a first and a second programmed sequence each to be executed iteratively, wherein said first programmed sequence incorporates instructions for monitoring the execution of said second programmed sequence, and said second programmed sequence incorporates instructions for monitoring said first programmed sequence, and wherein said first programmed sequence comprises the steps of resetting a first counter associated therewith and incrementing a second counter associated with said second programmed sequence, and said second programmed sequence comprises the steps of resetting said second counter and incrementing said first counter, a failure in the activation of a particular programmed sequence being detected when a counter associated with that sequence reaches a predetermined threshold.

15. The program of claim 14, wherein, for a given counter, said predetermined threshold is established so as to be reached upon just one failure of the corresponding programmed sequence to reset that counter.

16. The program of claim 12, wherein said programmed sequences comprise interrupt routines.

17. The program of claim 14, wherein said programmed sequences are taken from the group consisting of: routines and main, program loops.

18. A computer program comprising N programmed sequences, each to be executed iteratively, N being an integer greater than 1, wherein each of said programmed sequences is monitored by at least one other programmed sequence; and wherein each programmed sequence comprises program steps for incrementing a value in a respective counter associated with each programmed sequence it monitors and for checking, for each said counter, that the corresponding value has not reached a predetermined threshold, and wherein each monitored programmed sequence resets the counter associated therewith, a failure in the activation of a particular programmed sequence being detected when a counter associated with that sequence reaches the predetermined threshold.

19. The program of claim 18, wherein each programmed sequence is monitored by each of the N−1 other programmed sequences.

20. The program of claim 18, wherein said programmed sequences are taken from the group consisting of: routines and main program loops.

21. The program of claim 20, wherein said programmed sequences comprise interrupt routines.

22. A programmed apparatus for executing iteratively at least a first and a second programmed sequence, comprising first means associated with said first programmed sequence to monitor the execution of said second programmed sequence, and second means associated with said second programmed sequence to monitor said first programmed sequence, wherein said first means comprise means for resetting a first counter associated therewith and means for incrementing a second counter associated with said second means, and said second means comprise means for resetting said second counter and incrementing said first counter, said apparatus being operative to detect a failure in the activation of a particular programmed sequence when a counter associated with that sequence reaches a predetermined threshold.

23. The apparatus of claim 22, wherein said programmed sequences are taken from the group consisting of: routines and main program loops.

24. The apparatus of claim 22, wherein said programmed sequences comprise at least one interrupt routine.

25. The apparatus of claim 22, wherein said interrupt routine is triggered by an event generated by a timer or an external signal.

26. The apparatus of claim 22, wherein said predetermined threshold is established so as to be reached upon just one failure of a programmed sequence to reset the corresponding counter.

27. The apparatus of claim 22, wherein a failure in the activation of a programmed sequence, as determined by said monitoring, is made to cause a complete or partial reset of said apparatus.

28. An apparatus for executing at least N programmed sequences, each to be executed iteratively, N being an integer greater than 1, wherein each of said N programmed sequences is monitored by at least one of the N−1 other programmed sequence, and wherein each of said N programmed sequence is arranged to effect said monitoring function by incrementing a value in a counter associated with each respective programmed sequence it monitors and by checking, for each said counter, that a corresponding value has not reached a predetermined threshold, and wherein each monitored programmed sequence is arranged to reset the counter associated therewith, a failure in the activation of a particular programmed sequence being detected when a counter associated with that sequence reaches a predetermined threshold.

29. The apparatus of claim 28, wherein each programmed sequence is monitored by each of the N−1 other programmed sequences.

30. The apparatus of claim 28, wherein said predetermined threshold is established so as to be reached upon just one failure of a programmed sequence to reset the corresponding counter.

31. The apparatus of claim 28, wherein said programmed sequences are taken from the group consisting of: routines and main program loops.

32. The apparatus of claim 31, wherein said programmed sequences comprise interrupt routines.

33. The apparatus of claim 32, wherein said interrupt routines are triggered by events generated by a timer or external signals.

34. The apparatus of claim 28, wherein a failure in the activation of a programmed sequence, as determined by said monitoring, is made to cause a complete or partial reset of said apparatus.

35. A method of monitoring an activation of programmed sequences of a programmed system comprising N programmed sequences, each to be executed iteratively, N being an integer greater than 1, wherein each of said programmed sequences is monitored by at least one other programmed sequence, and wherein each programmed sequence comprises program steps for incrementing a value in a respective counter associated with each programmed sequence it monitors and for checking, for each said counter, that the corresponding value has not reached a predetermined threshold, and wherein each monitored programmed sequence resets the counter associated therewith, a failure in the activation of a particular programmed sequence being detected when a counter associated with that sequence reaches a predetermined threshold.

36. The method of claim 35, wherein each programmed sequence is monitored by each of the N−1 other programmed sequences.

37. The method of claim 35, wherein each programmed sequence is monitored by at least one of the N−1 other programmed sequences.

38. The program of claim 18, wherein each programmed sequence is monitored by at least one of the N−1 other programmed sequences.

39. The apparatus of claim 28, wherein each programmed sequence is monitored by at least one of the N−1 other programmed sequences.

* * * * *